United States Patent [19]

Sugiyama et al.

[11] Patent Number: 4,815,984
[45] Date of Patent: Mar. 28, 1989

[54] WIRE HARNESS ASSEMBLY

[75] Inventors: Masaaki Sugiyama; Mamoru Sawai, both of Shizuoka, Japan

[73] Assignee: Yazaki Corporation, Tokyo, Japan

[21] Appl. No.: 154,042

[22] Filed: Feb. 9, 1988

[30] Foreign Application Priority Data

Feb. 10, 1987 [JP] Japan .............................. 62-17242[U]

[51] Int. Cl.$^4$ ............................................. H01R 13/64
[52] U.S. Cl. ..................................... 439/211; 439/248; 49/502; 174/72 A; 296/146
[58] Field of Search ............. 174/72 A; 296/146, 208; 49/502; 439/34, 207–211, 247, 248, 552–554, 555–557

[56] References Cited

U.S. PATENT DOCUMENTS 3,753,212 8/1973 Yamada et al. ...................... 439/358
4,131,330 12/1978 Stupay ................................ 439/540

FOREIGN PATENT DOCUMENTS 0020834 1/1981 Fed. Rep. of Germany .
0093398 11/1983 Fed. Rep. of Germany .
0171737 2/1986 Fed. Rep. of Germany .
61-9111 1/1986 Japan .
977036 12/1964 United Kingdom .
1599853 2/1978 United Kingdom .

OTHER PUBLICATIONS

"Wiremold" ad, Electrical Construction & Maintenance, p. 42, Jan. 1962.

Primary Examiner—Gary F. Paumen
Attorney, Agent, or Firm—Robbins & Laramie

[57] ABSTRACT

A wire harness assembly is disclosed in which a wire harness having a primary wire bundle and a plurality of branch wires branched from the primary wire bundle is received in a wire protective casing composed of a casing body and a casing cover along with the arrangement configuration of the wire harness. A plurality of engagement holes are formed in the protective casing, corresponding to connectors provided at terminal ends of the branch wires. Cushion arms that are engaged with the engagement holes are formed on outer walls of housings of the connectors, so that the connectors are displaceable relative to the engagement holes.

6 Claims, 7 Drawing Sheets

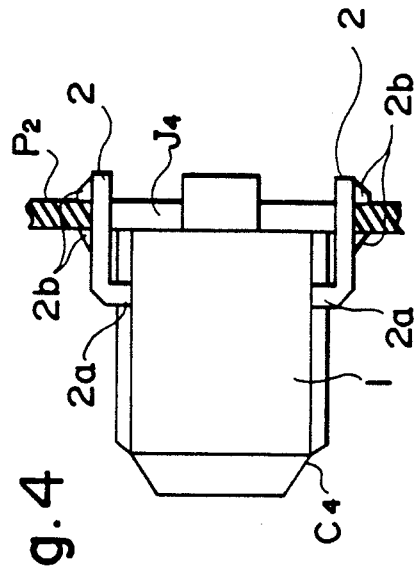
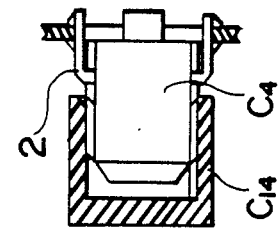
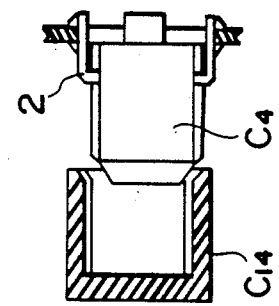
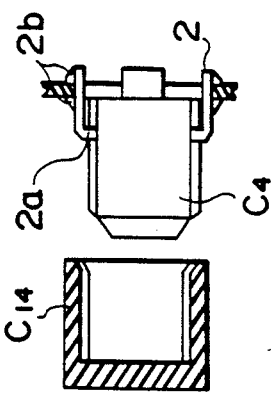

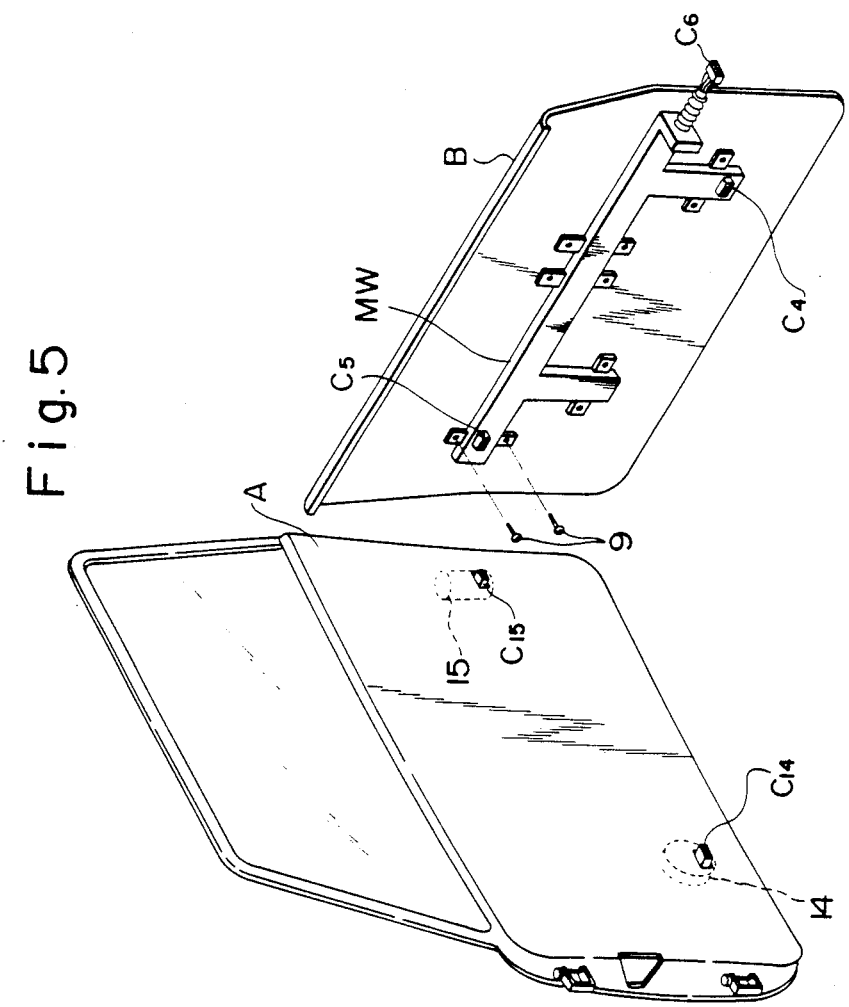

4,815,984

WIRE HARNESS ASSEMBLY

BACKGROUND OF THE INVENTION

1. Field of the Invention

This invention relates to a wire harness assembly which may enhance working efficiency and reliability thereof upon the connection with electronic or electric components in electrical wirings in an automotive vehicles.

2. Prior Art

In Japanese Patent Laid-Open Application No. 61-9111 assigned to the present assignee, there is proposed a method for facilitating the mounting work of a wire harness relative to an automotive body.

According to this method, respective conductors especially for a vehicle door are fixedly arranged in a two-dimensional manner, i.e., flat fashion, above a cover plate provided inside of a door frame of the automobile. Branch wires having at ends connectors are floatingly provided on the door wire harness apart from the cover plate. A bundle outlet guide portion is provided at a connection end, with the cowl side harness of the vehicle side, of the door wire harness. Also, a waterproof portion is formed by a grommet around the bundle guide outlet portion.

On the other hand, electronic or electric parts are provided on the cover plate and are electrically connected, in advance, to the branch wires through the connectors. The cover plate kept under this condition is combined with the door frame of the automotive vehicle in a manufacture line. The remaining wires are connected to a power window motor and a solenoid for automatic door locking within the door frame. At the same time, the water-proof portion such as the grommet at the bundle guide outlet portion is located at a guide outlet hole formed in the door frame. Finally, the cover plate is fastened onto the door frame.

With such a conventional arrangement, the door wire harness is provided in the flat manner relative to the cover plate located inside of the door frame, whereby the mounting work of the door wire harness may be facilitated in the manufacture or assembling line of vehicles. However, since the connectors connected to the electronic or electric parts are provided at distal ends of the branched wires separated from the primary wire bundle as in the ordinary wire harness, the work of connecting to the wire harness the electronic or electric parts to be received in the door frame must be performed. In addition, since it would be difficult to perform the connection work for the electronic or electrical parts within a limited or narrow space such as an interior of the door frame, the connectors will often fail to be completely connected to the associate wires.

SUMMARY OF THE INVENTION

Accordingly an object of the invention is to overcome the above-noted defects and to provide a wire harness assembly by which the mounting work onto the vehicle body and the connection work between the electronic or electric parts and the connectors may be performed, and which has a high reliability without any connection failure in the connectors.

BRIEF DESCRIPTION OF THE DRAWINGS

In the accompanying drawings:

FIG. 4 is a partially cross-sectional view showing the fitting condition of the connector relative to an associate hole;

FIG. 5 is a perspective view showing a condition in which the wire harness assembly is mounted on a cover plate inside of a door frame of an automotive vehicle;

FIGS. 6(a), (b) and (c) are views showing respectively a mechanism for absorbing a positioal offset between the connector on the side of the wire harness assembly and the associate connector;

DETAILED DESCRIPTION OF THE INVENTION

Figure 8:
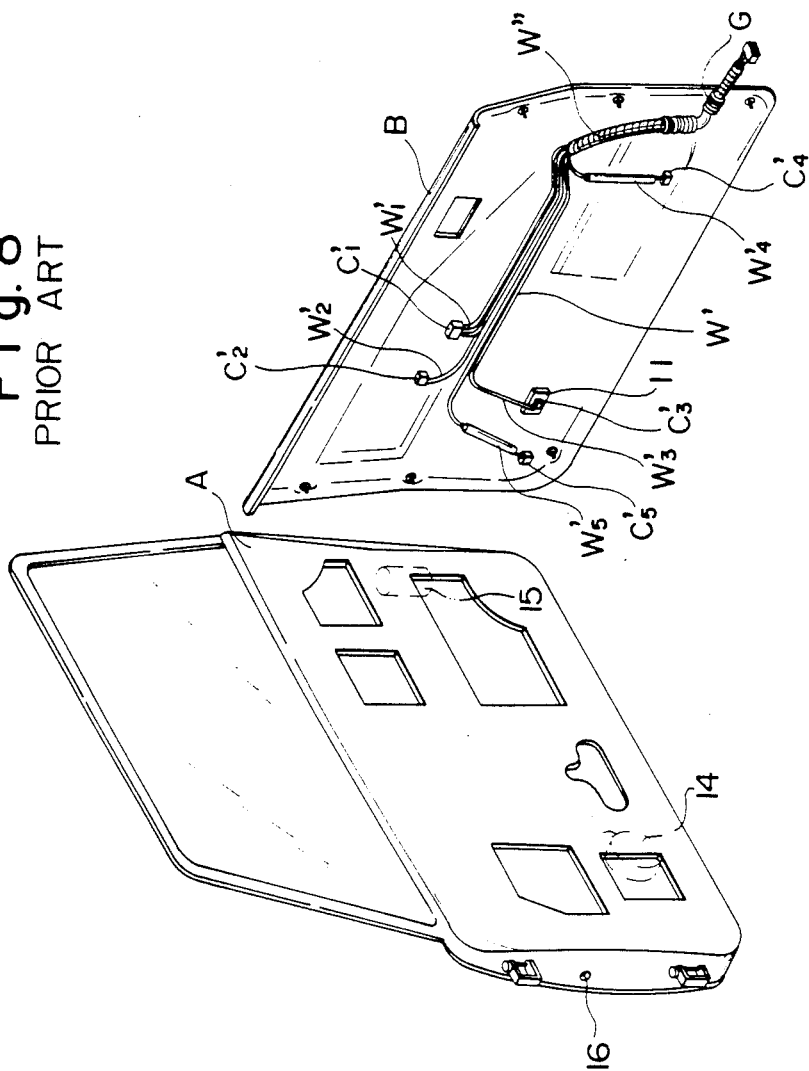
FIGS. 8 and 9 are views showing the prior art.

A method shown in the above-described Japanese Patent Application Laid-Open No. 61-9111 will first be described with reference to FIGS. 8 and 9. In FIG. 8, reference character A denotes a door frame of an automotive door, and reference numeral B denotes a cover plate to be provided inside of the door frame. Respective conductors of door wire harness W' are arranged in parallel and fixed to the cover plate B in a flat manner by adhesives or adhesive tapes.

In the wire harness W', branch wires W1', W2', W3', W4'W5', . . . , having connectors C1', C2', C3' C4', C5', . . . , at their distal ends are provided floatingly away from the cover plate B. At a connection end of the door wire harness W', to be connected to a cowl side harness on the vehicle body side, there is provided a bundle leading-out portion W''' which has a water proof portion by a grommet G.

Figure 9:
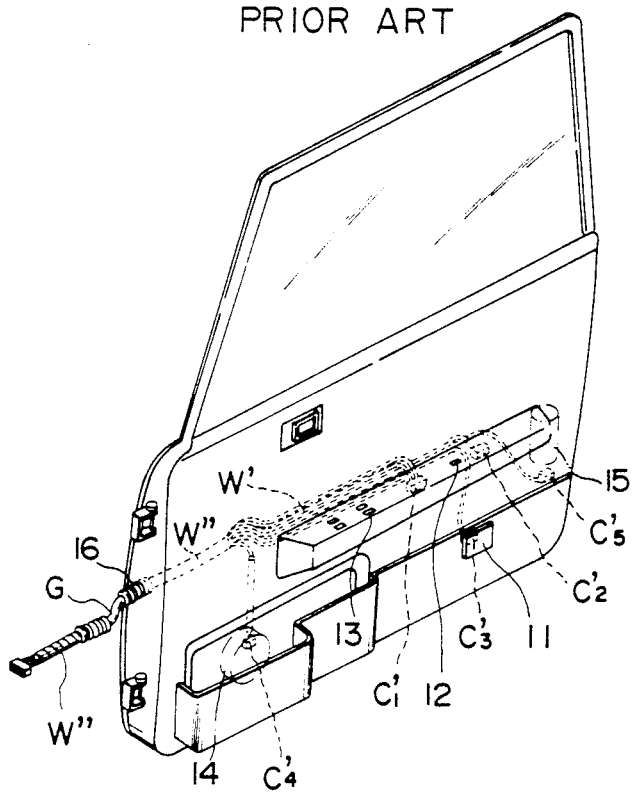

On the other hand, as shown in FIG. 9, there are provided electrical parts such as a courtesy lamp 11, a trunk opening switch 12, and a power window switch 13 which are connected in advance to the branch wires W3', W4' and W5' through the connectors C3', C4' and C5', respectively.

The cover plate B kept under this state is assembled with the automotive door frame A in the manufacture line. Then, the remaining branch wires W1' and W2' are connected to a power window motor 14 and an automatic door-locking solenoid 15 through the connectors W1' and W2'. At the same time, the water proof portion such as grommet G at the bundle leading-out portion W''' is located in a leading-out hole 16 of the door frame A. Finally, the cover plate B is secured to the door frame A.

Such a conventional method would frequently encounter the connection failure of the connectors as discussed before.

In order to overcome the above-noted defect, there is provided a wire harness assembly as shown in FIGS. 1 through 4. A wire harness W having a plurality of branch wires W1, W2, W3, W4 and W5 branched from a primary bundle W0 is received in a wire protective casing P composed of a casing body P1 and a casing cover P2 which are provided along a configuration of the wire harness W. Engagement holes J1, J2, J3, J4 and J5 corresponding to the terminal or distal connectors C1, C2, C3, C4 and C5 of the above described branch wires W1, W2, W3, W4 and W5 are formed in the wire protective casing P. A cushion arm 2 to be engaged with each of the engagement holes J1 to J5 is formed in an outer wall of each housing 1 of the connectors C1 to C5.

Figure 3:
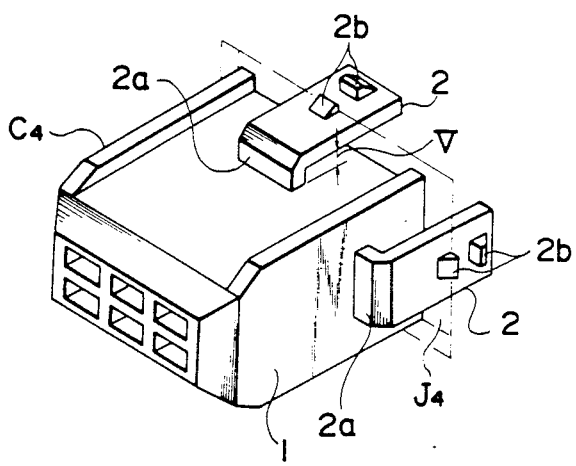
FIG. 3 is an enlarged perspective view showing a connector at a distal end of branch wires.
Figure 7:
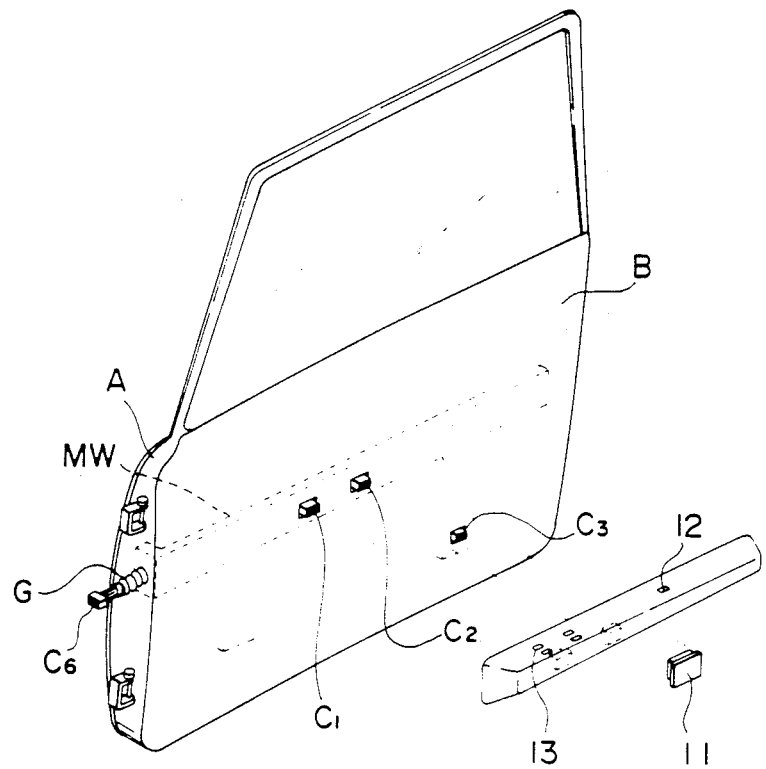
FIG. 7 is a perspective view showing the automotive door on which is mounted is the wire harness assembly shown in FIG. 2.

The wire harness W is formed as the door wire harness, and composed of the plurality of electrical wires by taping or the like. The plurality of branch wires W1, W2, W3, W4 and W5 extend from the primary wire W0 corresponding to the mounting locations of the electric parts within the door assembly. The respective brach wires W1 to W5 have connectors C1 to C5 for the connection with the electric parts at their ends. As best shown in FIGS. 3 and 4, the cushion arms 2 are provided around the four outer walls of the housing 1. Each of the cushion arm 2 extends in a direction opposite to the connector engagement direction while keeping a suitable flexible space the outer wall of the housing 1 through a proximal portion 2a raising therefrom. A pair of engagement claws 2b to be engaged with an inner edge of each of the engagement holes J1 to J5 are formed on an outer surface of the proximal portion 2a of the cushion arm 2.

On the connection end side of the wire harness W connected to a cowl side harness (not shown), there are provided a water proof part formed by a grommet G and a connector C6 for connection with a side harness. The grommet G is composed of a bellows-like sleeve portion G1 for water proof protection of the primary wire W0 and a mounting base plate portion G2 supporting the sleeve portion G1.

The wire protective casing P is composed of the casing body P1 made of synthetic resin and the casing cover P2 for the casing body. The casing body P1 having a troughform in cross-section is arranged in conformity with the shape of the arrangement shape of the wire harness W. In the example shown in FIG. 1, two branched portions P1' and P1" are extending in the form of a letter T. In the casing body P1, the engagement holes J4 and J5 corresponding to the connectors C4 and C5, fastening brackets 3 for the vehicle body and lock portions 4 for the casing cover P2 are provided at suitable positions. At the wire harness outlet portion of the casing body P1, there is formed a grommet receiving portion 5 extending from the casing body P1. An engagement groove 6 associated to the mounting base plate G2 is provided within the grommet receiving portion 5.

On the other hand, in the casing cover P2, there are provided the engagement holes J1 to J3 corresponding to the connectors C1 to C3 and the lock retaining holes 8 to be engaged with the lock portions 4.

Figure 1:
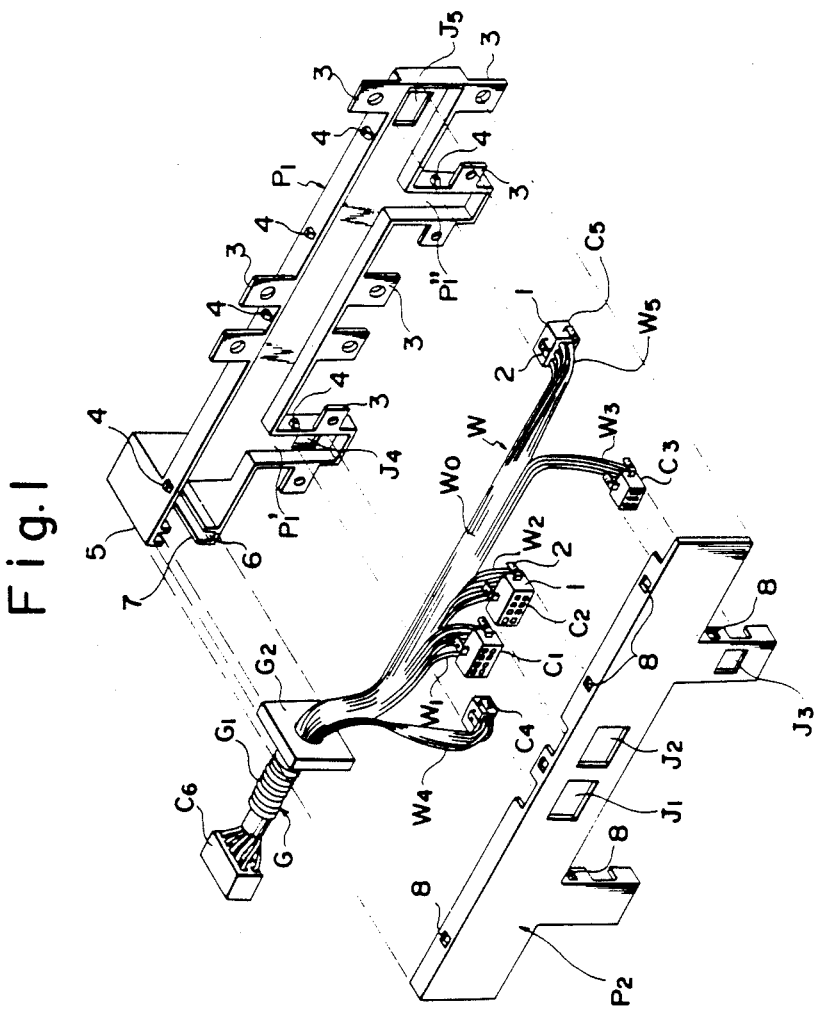
FIG. 1 is an exploded perspective view showing a typical example of a wire harness assembly in accordance with the present invention.
Figure 2:
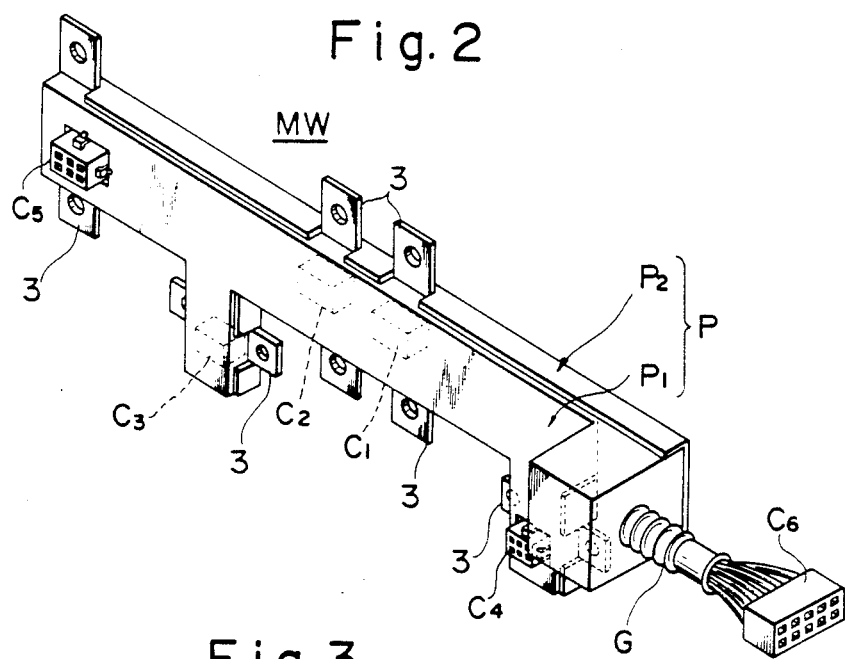
FIG. 2 is an assembled perspective view showing the wire harness assembly of FIG. 1.

The assembling work of the wire harness assembly according to the present invention will now be described. As shown in FIG. 1, the wire harness W which has been bundled in advance is received in the casing body P1. The connectors C4 and C5 at the terminals of the branch wires W4 and W5 are inserted into the engagement holes J4 and J5, respectively. Thereafter, the mounting base plate G2 for the grommet G is inserted into the engagement grooves 6 of the grommet receiving portion 5. Subsequently, the connectors C1, C2 and C3 of the remaining branch wires W1, W2 and W3 are inserted into the engagement hole J1, J2 and J3 so that the casing cover P2 is fitted to the casing body P1 and the lock portions 4 are engaged with the lock retaining holes 8, thereby readily performing the assembling work.

The thus assembled wire harness assembly MW (see FIG. 2) is threadedly fastened to the cover plate B by screws 9 as shown in FIG. 5, and the cover plate B is fastened to the door frame A, whereby the connectors C4 and C5 are automatically engaged with connectors C14 and C15 for a power window motor 14 and a solenoid 15 for the automatic door lock that are electric parts disposed in advance within the door frame A.

During the engagement work between the door frame A and the cover plate B, a positional offset between the connectors C4 and C5 of the wire harness assembly MW and the connectors C14 and C15 of the door frame A would be raised due to the fact that the connectors C14 and C15 for the electric parts 14 and 15 extend outwardly from the door frame. However, according to the present invention, the connectors C4 and C5 are inserted into the engagement holes by the four cushion arms 2 as shown in FIGS. 3 and 4, and the cushion arms 2 are flexible vertically relative to the outer walls of the housing 1. Accordingly, even if there is a positional offset between the connector C4 on the wire harness assembly MW side and the connector C14 on the door frame A side, the connector C4 are elastically shifted up and down or right and left by the cushion arms 2 to absorb the positional offset and to be aligned with the associated connector C14 as shown in FIGS. 6(a) to 6(c).

Subsequently, after the cover plate B has been mounted on the door frame, the remaining electric parts such as courtecy lamp 11, the trunk opening switch 12 and the power window switch 13 (which is integrally formed with the switch 12) are mounted on the assembly from the outside of the cover plate B (from the passenger's room). Also, during this mounting work, the respective connectors C1, C2 and C3 on the wire harness assembly MW side are engaged and connected with the connectors of the electrical parts 11 to 13 at the same time when the electrical parts 11 to 13 are mounted on the cover plate B.

The foregoing description has been directed to the example in which the wire harness assembly is applied to the door wire harness of the vehicle, but it is apparent for those skilled in the art that the present invention may be applied in the same manner to instrument panels, rear seat panels or any other like parts.

The effect of the invention is as follows. As has been described above, the wire harness assembly according to the invention is free from the troublesome works such that the wire harness assembly is manually connected, with connectors, one by one, to the electrical parts which are to be disposed in a narrow or limited space such as a space within the door frame. Also, since the connectors relative to the electric parts are positioned in advance in the wire harness assembly, it is possible to forget the connections or to prevent the insufficient connections. In addition, since the connectors on the wire harness assembly are provided with positional offset absorbing mechanisms (cushion arms), there is no fear that the connection would be incomplete.

What is claimed is:

1. A wire harness assembly comprising:
 a wire harness having a primary wire bundle and a plurality of branch wires branched from said primary wire bundle;

a wire protective casing composed of a casing body and a casing cover, said wire protective casing being formed in conformity with a configuration of said wire harness, said casing encasing therein said wire harness and having engagement holes; and a plurality of connectors connected to terminal ends of said branch wires, said plurality of connectors for engaging corresponding ones of said engagement holes of said casing, said connectors each having cushion arms formed on outer peripheral walls of said connectors, said cushion arms being engaged with said engagement holes of said casing, whereby said connectors are displaceably engaged laterally with said holes of said casing.

2. The assembly according to claim 1, wherein each of said connectors has four outer peripheral walls on which two pairs of opposite cushion arms are formed, so that each of said connectors is elastically displaceable in a first direction and a second direction normal to said first direction.

3. The assembly according to claim 2, wherein each of said cushion arms has a pair of engagement claws in engagement with an associate edge of each of said engagement holes of said casing so that the connectors are displaceable in said first and second direction but is prevented from moving in a direction perpendicular to both the first and second directions.

4. The assembly according to claim 3, wherein said casing is substantially in the form of a rectilinear shape, and said casing including mounting means for fastening to an automotive inner cover panel.

5. The assembly according to claim 4, wherein at least one of said connectors is engageable with an associated connector provided on an automotive door.

6. The assembly according to claim 4, wherein said wire harness is provided with a water proof grommet at one end of said casing.

* * * * *